US005088534A

United States Patent [19]

Engel

[11] Patent Number: 5,088,534

[45] Date of Patent: Feb. 18, 1992

[54] TRACTION DEVICE HAVING PROJECTING RIBS WHICH FIT INTO GROOVES OF A TIRE TREAD

[76] Inventor: Rudolf Engel, Michael-Steinherr-Str. 17, D-8904 Friedberg, Fed. Rep. of Germany

[21] Appl. No.: 575,157

[22] Filed: Aug. 29, 1990

[30] Foreign Application Priority Data

Sep. 20, 1989 [DE] Fed. Rep. of Germany ....... 3931279

[51] Int. Cl.[5] ......................... B60C 27/20; B60C 7/22

[52] U.S. Cl. .................................... 152/208; 152/176; 152/210; 152/216; 152/225 R

[58] Field of Search ............... 152/170, 176, 181, 182, 152/210, 211, 212, 208, 225 R, 216

[56] References Cited

U.S. PATENT DOCUMENTS 4,119,132 10/1978 Ries .................................... 152/210
4,338,988 7/1982 Brooks et al. ....................... 152/210
4,669,569 6/1987 Suzuki et al. ...................... 180/249

FOREIGN PATENT DOCUMENTS 2122009 11/1972 Fed. Rep. of Germany ...... 152/210
2606703 8/1977 Fed. Rep. of Germany ...... 152/210
2648863 5/1978 Fed. Rep. of Germany ...... 152/210

*Primary Examiner*—Michael W. Ball
*Assistant Examiner*—Gregory J. Wilber
*Attorney, Agent, or Firm*—Edwin D. Schindler

[57] ABSTRACT

A device for improving the winter road holding properties of automobiles is disclosed, which includes anti-skid members arranged in grooves in tire treads so as to surround lugs of the tread. A long working life of the anti-skid members may be attained if means are provided for moving the anti-skid members between non-retracted settings and retracted positions in which the anti-skid members are in the grooves.

22 Claims, 2 Drawing Sheets

TRACTION DEVICE HAVING PROJECTING RIBS WHICH FIT INTO GROOVES OF A TIRE TREAD

BACKGROUND OF THE INVENTION

The invention relates to a device for improving the winter running properties of automobile tires comprising an arrangement of anti-skid members adapted to fit into the grooves of a tire tread, preferably in the form of an arrangement of lug-surrounding ribs each encompassing one lug of the tread.

Devices of this type are described in the German patent publications 2,606,703 A and 2,648,863 A. In these known devices the anti-skid members are fixed on the tread. The active edges of the anti-skid members thus continuously engage the surface of the road whatever the state thereof. However for practical purposes the road surface is free of ice and snow during most of the winter. In the case of known arrangements rapid wear of the active edges is thus to be expected.

SHORT SUMMARY OF THE PRESENT INVENTION

Accordingly one object of the present invention is to provide a device of the initially mentioned type which is so improved by the use of simple and economic means that the anti-skid members may be brought into and out of engagement with the road surface in accordance with needs.

In order to achieve these or other objects appearing from the present specification, claims and drawings, in the present invention the anti-skid members, whose height is at the most equal to the depth of the grooves in the tread and which are arranged so that they may be radially slid in relation to the axis of the tire, are connected by way of stiff lateral arms with the rim carrying the respective tire and are able to be slid in the radial direction by means of at least one actuating device associated with one of their arms.

These measures ensure that the active edges of the anti-skid members are not unnecessarily exposed to wear so that they have a long working life. Nevertheless the measures in accordance with the invention ensure safe driving during winter use of the vehicle. A further advantage of the measures in accordance with the invention is to be seen in the fact that the actuating means provided for operation of the anti-skid members to be mounted on the tread and bearing against the wheel rim are arranged clear of the tire, a feature which makes possible simple mounting and fitting to tires already in use and also relatively simple mounting.

In accordance with a further possible development of the invention the height of the anti-skid members may be smaller than the depth of the grooves in the tread. This feature ensures that the anti-skid members may be completely retracted in the grooves, this then ensuring a particularly effective way of preventing unnecessary wear of the members.

A further possible, and particularly expedient feature of the invention is such that in the case of a grid-like form of the anti-skid members the clearance cross section of the individual lug-surrounding ribs is sufficiently oversize in relation to the associated lug cross section to allow for a sliding fit. These features lead not only to simple fitting but at the same time ensure that comparatively small actuating forces are required for moving the anti-skid members between their retracted and non-retracted positions, this making the design simpler. Another point is that the said features safeguard the tire against undue wear.

In keeping with yet another possible form of the invention at least at its part adjacent to the tire each anti-skid member may have a plurality of and more particularly two arms which are offset from each other in the peripheral direction. This leads to the advantage of a reliable transfer of thrust without any tipping effect. It is a further advantage if each arm is provided with its own actuating means. This ensures that it is possible to set the same depth of engagement or effect of the anti-skid edges over the entire tread face.

It is convenient if the wheel rim is provided with circumferential carriers for the arms of the anti-skid members or, respectively, actuating means. This makes possible simple fitting and at the same time guarantees reliable transfer of forces.

It is an advantage if at least the carrier mounted on the outer side of the wheel is designed in the form of a lug-surrounding rib detachably secured to the wheel rim. It is then an advantage that the actuating means may be pre-mounted on this ring so that final assembly is simplified. This design makes possible accommodation of the actuating means in a zone which is protected by the outermost edges of the tire so that the outer actuating devices are not endangered either.

In accordance with a further possible development of the invention it is possible for at least the inner carrier to be designed in the form of a ring, formed or molded on the wheel rim and preferably in the form of an extension of a lateral part of the rim flange. This design leads to a particularly simple construction of vehicle wheels which are specially customized for being fitted with the device in accordance with the invention.

As part of a further advantageous feature of the present invention the circumferential carriers are provided with a guard flange at least partly covering over the actuating means mounted on the carriers. This means that there is a reliable way of preventing both fouling of the actuating means and also damage thereto.

In accordance with a further possible development of the invention it is possible for the actuating means to be designed at least partly in the form of cylinder and piston units which are preferably of the hydraulically operated type. In this respect it is not only a question of particularly well proven and sturdy by also of particularly economic components. Simultaneously such a design offers the advantage of providing a comparatively simple way of allowing for ganged operation from one point so that the user will find the system more convenient.

In order to ensure automatic operation of the actuating means it may be expedient to provide an ice sensor on the vehicle by means of which the actuating means may be rendered operational. This measure again renders the system particularly simple and reliable to operate.

Further features and advantages of the invention will be gathered from the claims and the ensuing detailed description of one embodiment thereof referring to the drawings.

LIST OF THE SEVERAL VIEWS OF THE DRAWINGS

DETAILED DESCRIPTION OF WORKING EMBODIMENT OF THE INVENTION

Figure 1:
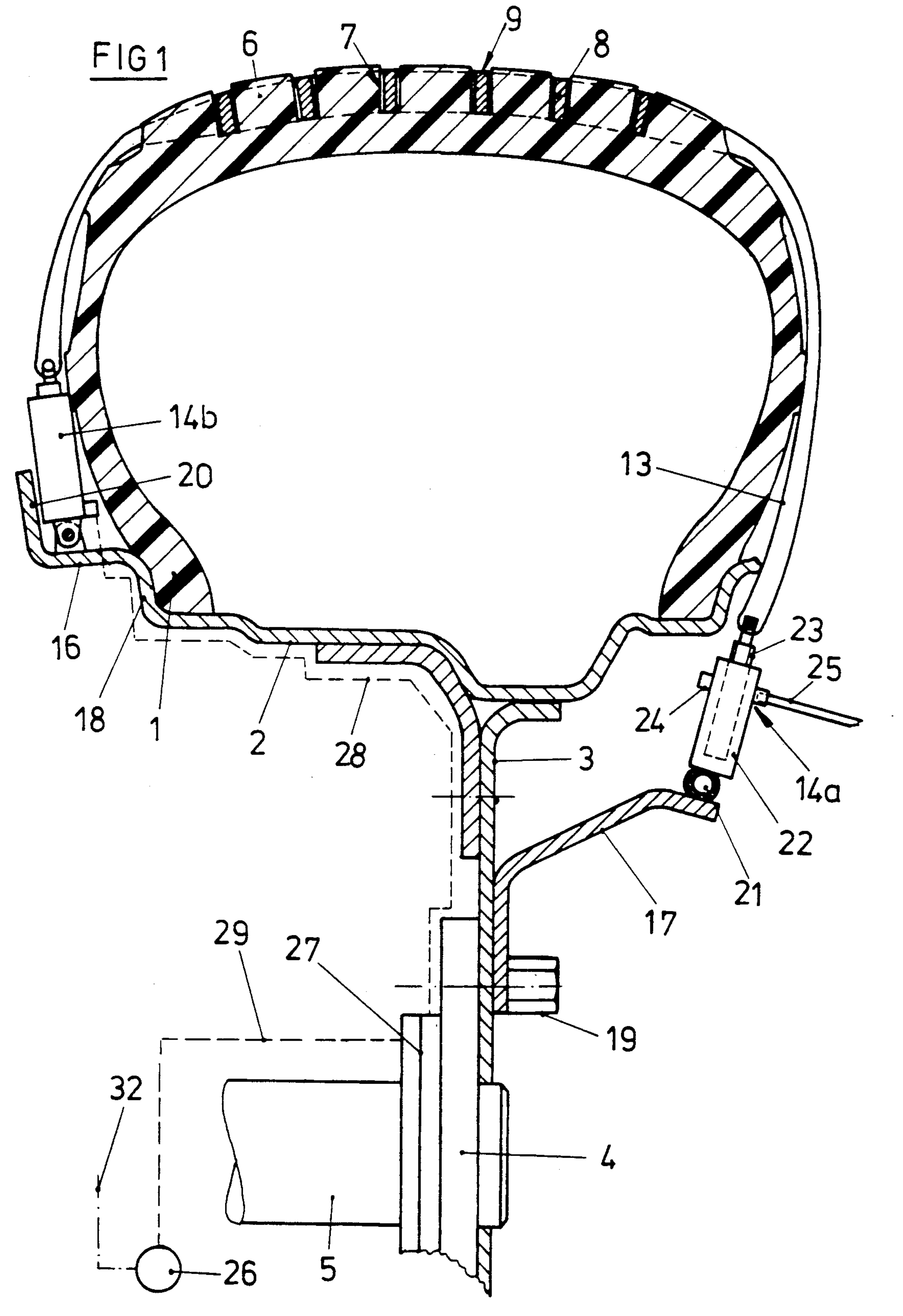
FIG. 1 is a radial section taken through an automobile wheel equipped with the device in accordance with the invention.

The automobile wheel to be seen in FIG. 1 comprises a tire 1 in the form of a vulcanized molding and which is mounted on a rim ring 2, which in cross section is like a circular disk. The wheel rim ring 2 is secured to a plate-like wheel member 3, which in the present case is attached to a wheel hub 4, which is borne by a driven axle 5. The tire 1 has a tread pattern or profile. This pattern comprises lugs or bars 6 separated by grooves 7 therebetween.

In order to enhance the winter road holding properties anti-skid members 8 are fitted in the grooves 7 whose radially outer edges form active edges 9 able to be brought into engagement with the road surface. The anti-skid members 9 provided in the present case extend along the entire breadth of the tire and along part of the circumference of the tire. The anti-skid member 8 shown in FIG. 2 itself consists of a several ribs 10 which encompass one respective lug or bar 6 of the tread and are connected with each other by ribs 11 in such a manner that there is a grid-like carrier 12. The same extend respectively over an angle of arc equal to approximately 15° to 30° and more particularly 20° and also across the full breadth of the tread, of which the lugs 6 form part. Accordingly there are a number such carriers 12 arranged on the circumference of a tire in sequence.

The height of the lug-surrounding ribs fitted around the lugs 6 and accordingly the height of the anti-skid members 8 is, as will best be seen from FIG. 1, about 1 mm less than the tread depth in the present working embodiment of the invention, that is to say about 1 mm less than the tread pattern depth (depth of the grooves 7). As a result the anti-skid members 8 are able to be completely retracted into the grooves 7 so that there is no unnecessary wear of the active edges 9 when the roads are not in a wintery state. In case of need only, that is to say when there is snow and/or ice on the roads, the active edges 9 are brought into engagement with the road surface.

Figure 2:
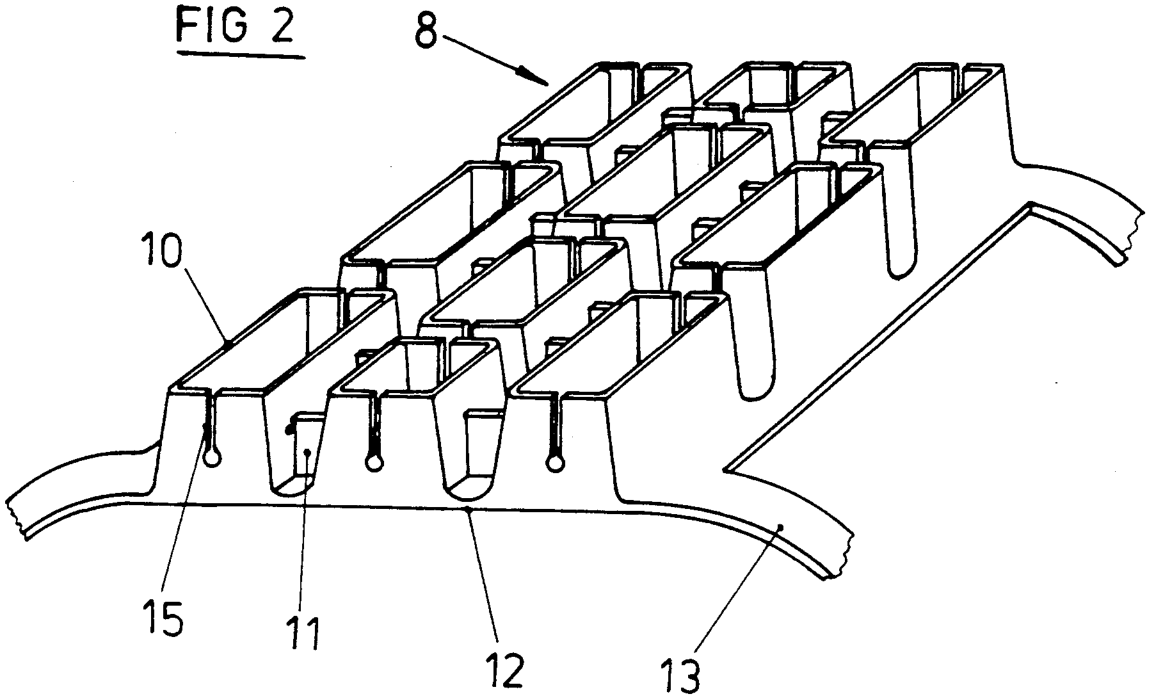
FIG. 2 is a perspective view of a preferred form of anti-skid member.

For doing this the anti-skid members 8 are arranged so that they may be moved radially between a retracted and a non-retracted setting. The anti-skid members 8 able to be laid within the pattern of the tread are for this purpose, see FIGS. 1 and 2, provided at their two side edges with two respective lateral arms 13, which in the present case are arranged adjacent to the corners, and it is, via these arms that they are connected by way of actuating means 14*a*, 14*b*, see FIG. 1, with the wheel rim, that is to say with the rim member 3 or the rim ring 2. Furthermore the lug-surrounding ribs 10 fitted around the lugs 6, are so oversize in relation to the lugs 6 that there is a running fit, i.e. possibility of readily moving in the radial direction. In the illustrated working embodiment the lug-surrounding ribs 10 are furthermore, as will be seen from FIG. 2, provided with radial slots 15 which endow such lug-surrounding ribs with a certain degree of elasticity so that the same will still be able to move when the lugs 6 have been somewhat deformingly compressed.

In the depicted working embodiment all the arms 13 are provided with actuating means 14*a*, 14*b*, which are pivotally joined with the wheel rim. It would however also be possible to provide actuating means only on one side of the tire and to pivotally connect the opposite arms 13 directly to the wheel rim. In such a case the anti-skid member 8 would be practically tilted about the joints of the arms devoid of actuating means when the actuating means are rendered operational.

In order to connect the arms 13 or, respectively, the actuating means 14*a*, 14*b*, the wheel rim is provided with an inner carrier 16 adjacent to the inner side thereof and on the wheel outer side the wheel rim is provided with a circumferential external carrier 17, this also being shown in FIG. 1. In this respect it may be a question of parts which are arranged symmetrically to the median plane of the wheel rim. In the illustrated working embodiment the inner carrier 16 and the outer carrier 17 are different in design. The inner carrier 16 is in this case simply in the form of an extension of the edge part of the inner rim flange 18. In this respect it is a question of a member already formed or molded on the rim. The outer carrier 17 is in the present case in the form of a ring adapted to be detachably secured to the rim member. The ring may with advantage be placed so that it is radially outside the rim ring 2 and so that it does not project axially past the outermost lateral edges of the tire 1 and there will in this case be a chamber, not projecting past the outer rim edges, in order to accommodate and guard the actuating means. The ring forming the outer circumferential carrier 17 is in the present case simply able to be secured in place on the rim member 3 by the wheel nuts 19. The inner carrier 16 is in this case provided with guard flange 20 partly covering over the actuating means mounted on the carrier 16. A similar guard flange may also be formed on the ring forming the outer carrier 17.

The actuating means 14*a*, 14*b* for the arms 13 may be arranged to operate mechanically, electrically, hydraulically or pneumatically. Manually operated mechanical actuating means are however only suitable for the outer side of the tire which is accessible form the outside. Accordingly in the case of the working embodiment shown in FIG. 1 the actuating means 14*a* mounted on the outer carrier 17 are to be in the form of screw drives. The same may be fitted with a respective threaded bushing 22 which is able to be turned on a ball joint 21 and is mounted in a rotatable and pivoting manner on the carrier 17, there being a threaded drive screw 23 running in the bushing 22 and pivoted or fixed on the associated arm 13. The threaded bushing or drive nut 22 may be provided with radial male pins and/or with holes 24 in order to receive an actuating means, which in the present case is in the form of a socket screw wrench 25.

Figure 3:
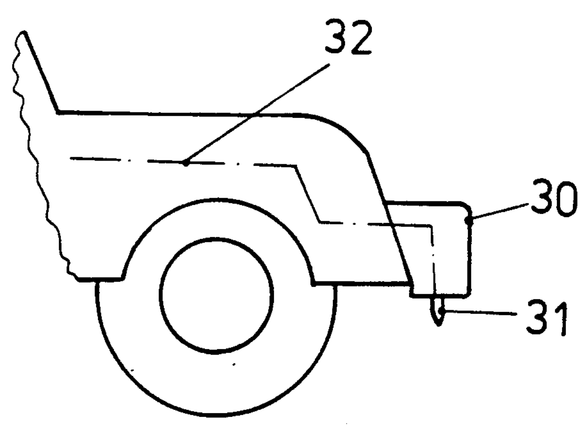
FIG. 3 is a diagrammatic view of one possible embodiment with an ice sensor.

The actuating means 14*b* mounted on the inner carrier 16 are in the present case, as will furthermore be seen in FIG. 1, constituted by piston and cylinder units, which are driven by oil under pressure. These piston and cylinder units are connected respectively by a pressure line with a central pressure source, in the present case in the form of a pump indicated at 26 for ganged operation. Adjacent to the wheel rim the pressure lines are in the form of ducts 28 running from a connector 27 allowing relative rotary motion in the hub 4 and extending to the individual cylinder and piston units. Between the pump 26 and the connector 27 allowing relative rotary motion it is possible to have a common main line 29 secured to the vehicle chassis so that the ducts 28 extend from it. In a simple design it may be sufficient if the pump 26 is able to be turned on and off by the driver without leaving his seat. Such a feature provides advantages over separate manual actuation of the actuating means themselves, as is indicated on the right in FIG. 1, so that there is a great simplification of operation and greater convenience. In order to further increase reliability and safety it is however also possible to provide for automatic activation of the actuating means. For this purpose, see FIG. 3, it is possible to provide an ice sensor 31 on the vehicle under the front bumper 30 so that a control line 32 extends from it. It is by means of this signal line 32 that the pump may be controlled as is also indicated in FIG. 1.

The anti-skid members 8 may be in the form of castings or pressed moldings or of light alloy. In the illustrated working embodiment it is to be a question of injected plastic moldings. If the design of the configuration of the arms 13 does not provide a sufficiently strong design, the structure may be reinforced by fiber. It would also be possible not to make the anti-skid members 8 in the form of integral members but in the form of members with a number of multipart structures, this making possible the specific adaptation of the respective materials used to suit the loads to be encountered. In such a case the grids 12, for instance, may be in the form of plastic injection moldings 12 and the arms 13 thereon may be in the form of metal moldings.

I claim:

1. A device for improving the winter road holding properties of an automobile tire having a tread with lugs separated by grooves, comprising lug-surrounding anti-skid members composed of an arrangement of lug-surrounding ribs, the anti-skid members, whose height is at the most equal to a depth of the grooves in the tread and which are arranged so that they may be radially slid in relation to the axis of the tire, being connected by way of lateral stiff arms with a wheel rim carrying the respective tire and being able to be slid in a radial direction by means of at least one actuating device associated with one of their arms.

2. The device as claimed in claim 1, wherein the height of the anti-skid members is less than the depth of the grooves in the tread.

3. The device as claimed in claim 1, wherein said anti-skid members constitute a grid structure and the clearance width of the individual anti-skid members is such in relation to the size of tread lugs surrounded thereby that there is a sliding fit.

4. The device as claimed in claim 1, wherein at least adjacent to one side of the tire each anti-skid member has at least two arms extending towards each other in the circumferential direction of the tire.

5. The device as claimed in claim 1, wherein each arm is provided with an actuating means.

6. The device as claimed in claim 5, wherein at least some of the actuating means are arranged on an outer side of said wheel, said outer side of the wheel being a side pointing outwardly when viewing the automobile, the actuating means being mechanically operable.

7. The device as claimed in claim 6, wherein the mechanically operable actuating means are in the form of drive screws.

8. The device as claimed in claim 1, wherein at least the arms devoid of actuating means and the actuating means are pivotally connected with the wheel rim.

9. The device as claimed in claim 1, wherein the wheel rim of a wheel of an automobile supporting said device is provided with circumferentially directed carriers for the arms.

10. The device as claimed in claim 9, wherein on at least one side of the wheel rim there is a ring detachably secured to the wheel rim as a carrier.

11. The device as claimed in claim 10, wherein on an outer side of the wheel rim is the ring detachably secured to the wheel rim as the carrier, said outer side of the wheel rim being a side pointing outwardly when viewing the automobile.

12. The device as claimed in claim 10, wherein the ring constituting a outer carrier is adapted to be held in place by wheel nuts of the wheel.

13. The device as claimed in claim 9, wherein two of said circumferentially directed carriers are provided and at least one of said circumferentially directed carriers is provided with a guard flange, at least partially covering the actuating means received thereon.

14. The device as claimed in claim 1, comprising a ring as a carrier formed on at least one side of the wheel rim.

15. The device as claimed in claim 14, wherein the carrier formed on the rim is in the form of an edge strip of a rim flange.

16. The device as claimed in claim 14, wherein the ring being a carrier is formed on an inner side of the wheel rim, said inner side of the wheel rim being a side pointing inwardly when viewing the automobile.

17. The device as claimed in claim 1, wherein at least some of the actuating devices are constituted by piston and cylinder units able to be driven by a fluid under pressure.

18. The device as claimed in claim 17, comprising a central controller for activation of all the piston and cylinder units of each tire for connection of such actuating means with a source of fluid under pressure.

19. The device as claimed in claim 18, further comprising a wheel hub for each wheel of an automobile and adjacent to each wheel hub, a rotary connector to which a main line is connected with a central source of drive fluid under pressure with branch ducts extending from the rotary connector to each of the piston and cylinder units of each wheel, said branch ducts extending from the main line.

20. The device as claimed in claim 1, comprising an ice sensor for actuation of the device by means of a central controller mounted on a vehicle with said wheel.

21. The device as claimed in claim 20, wherein the ice sensor is arranged adjacent to a front end of the automobile.

22. The device as claimed in claim 1, wherein the anti-skid members are constituted by plastic moldings which are at least partly fiber reinforced.

* * * * *